July 27, 1965    H. L. JOHNSON    3,197,141
STEAM TRAP
Original Filed March 1, 1961
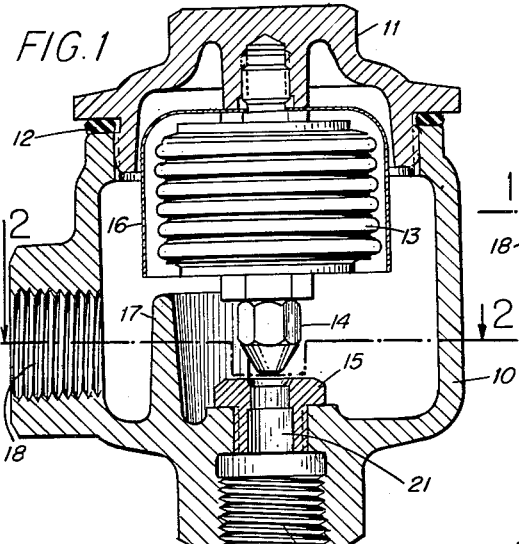
FIG.1
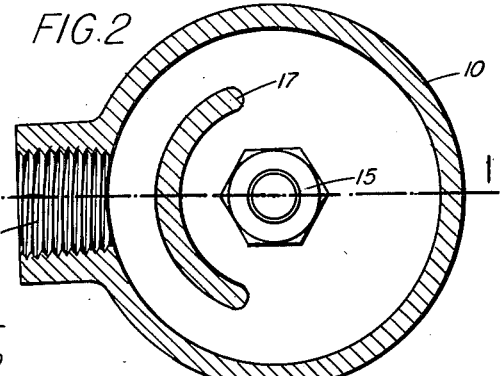
FIG.2
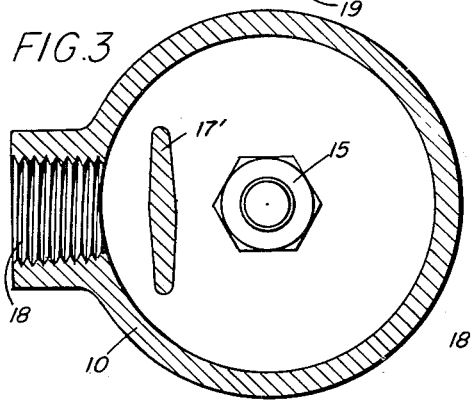
FIG.3
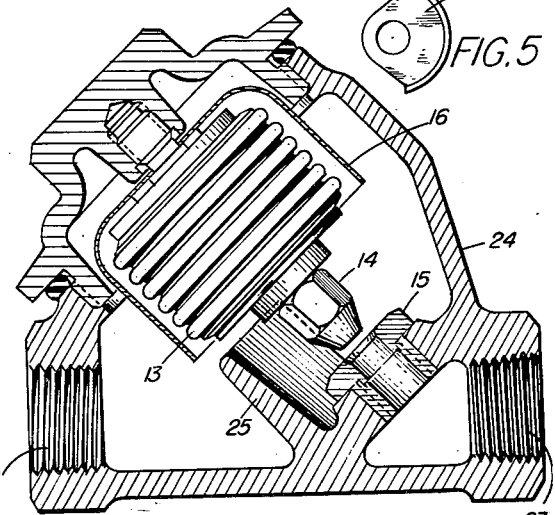
FIG.5
FIG.6
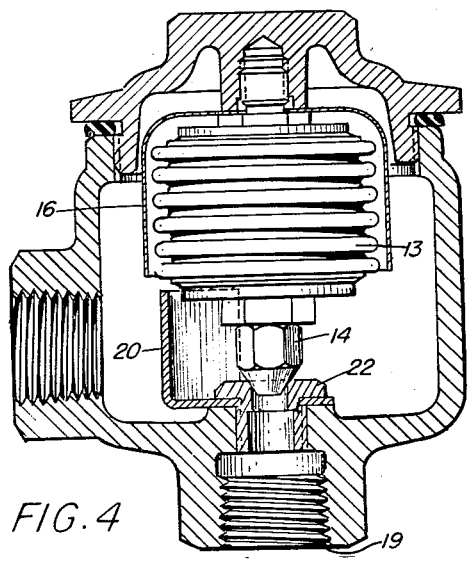
FIG.4
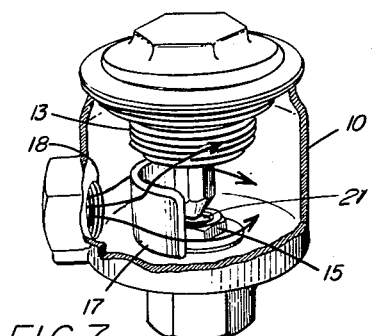
FIG.7
Inventor
Harold L. Johnson
By his attorneys
Howson and Howson

United States Patent Office 3,197,141
Patented July 27, 1965

3,197,141
STEAM TRAP
Harold L. Johnson, Dallas Township, Luzerne County, Pa., assignor to W. H. Nicholson and Company, Wilkes-Barre, Pa., a corporation of Pennsylvania
Continuation of application Ser. No. 92,528, Mar. 1, 1961.
This application Aug. 19, 1963, Ser. No. 303,726
3 Claims. (Cl. 236—56)

This is a continuation of my prior copending application, Serial No. 92,528, filed March 1, 1961, which is now abandoned.

This invention relates to an improvement in steam traps and more particularly to thermostatic steam traps. In thermostatic steam traps the steam inlet is generally on a level with or above the discharge valve seat. In such a trap the condensate and steam flow directly in a straight path toward the discharge orifice and as a result a certain amount of live steam goes out the discharge every time the trap rids itself of condensate. The primary object of the invention is to increase the thermal efficiency of the trap by preventing the waste of live steam through the discharge passages of the trap.

The present invention incorporates a solid baffle or deflector in the trap of such shape and so located in the direct flow path that it will prevent the discharge of live steam which enters the trap. In addition, the construction and location of the deflector are such that the trap will be gravity drained of substantially all condensate whenever the steam is turned off.

In the drawings FIGURE 1 is a view in vertical section through the center line of one typical design of a thermostatic steam trap, commonly referred to as an angle type, containing the novel baffle, the view being taken at the location of line 1—1 of FIGURE 2.

FIGURE 2 is a plan view in horizontal section at the level of the inlet taken on the line 2—2 of FIGURE 1 with the valve omitted.

FIGURE 3 is a view similar to FIGURE 2 showing a modified straight shape of baffle.

FIGURE 4 is a view similar to FIGURE 1 showing a detachable form of baffle.

FIGURE 5 is a plan view of the baffle of FIGURE 4.

FIGURE 6 is a view in vertical section through the center line of a modified form of trap known as a straight-through type with in-line inlet and discharge for horizontal or vertical installation, and containing a baffle in accordance with the invention.

FIGURE 7 is a perspective view of the trap of FIGURES 1 and 2 with the casing broken away showing, by means of arrows, the paths taken by the steam when the trap is discharging.

The purpose of a steam trap is to open a valve, to permit the discharge of condensate (water) and non-condensable gases which flow to the trap from the piping or apparatus drained, and then to close the valve and prevent the discharge of live steam which enters the trap as the condensate flow diminishes. The invention is applicable more particularly to those types of traps in which the condensate and steam entering the body or casing of the trap flow directly in a straight path toward the discharge orifice. It is applicable to steam traps having a thermostatic element such as a collapsible bellows, diaphragm or bimetallic element construction, as it is in these types of steam traps that the direct flow just referred to is most frequently encountered.

The primary objective of the invention is to increase the thermal efficiency of a trap of this type by preventing the transmission or escape of live steam into the discharge passages of the trap. In industrial and processing operations where many traps are utilized, waste of live steam at each discharge represents an appreciable percentage of the fuel cost. This is particularly costly with large orifice, big capacity traps, such as the thermostatic types previously defined, especially when such traps are utilized for high pressure applications where the velocity of the flowing mediums is high.

In FIGURES 1 and 2 of the drawings, the construction illustrated has the following usual parts. A trap body or casing 10, the cover or cap 11, and a gasket 12 for sealing the chamber formed by the casing 10 and cover 11 against escape of pressure fluid. The thermo-sensitive element shown is a collapsible bellows 13 but any convoluted or plate section bellows, diaphragms or bimetallic thermostatic elements such as are in common use may be used in place of the bellows. There is the usual discharge valve 14 for the trap, this being carried underneath the bellows 13. There is a valve seat 15 in the casing for the valve 14, this valve seat leading to a discharge orifice 21 through which the condensate is discharged into the outlet 19 at the bottom of the casing 10. A shield or guard 16 is shown around the sides of the thermostatic element, this being utilized with some traps to protect the thermostatic element.

A second objection of the invention, namely to increase the ability of the trap to rid itself of condensate when the steam is turned off, is provided for by locating the inlet 18 (in the casing 10) at least as high as the valve seat 15. This puts the inlet 18 at a high enough level to permit a straight line flow from the inlet 18 to the valve seat 15 if the new baffle were not in the way. The high level of inlet 18 permits substantially all the condensate to be gravity fed to the outlet 19 in casing 10. When the steam is shut off and the thermal element 13 has cooled sufficiently to contract, valve 14 is lifted away from orifice 21 of valve seat 15 and the condensate is gravity fed into the outlet 19 and out of the trap. By thus preventing the retention of any considerable volume of water when the steam is shut off, freezing damage is avoided. This is particularly important in those situations in which such a trap is subjected to low temperatures. The straight through construction of FIG. 6 is similarly freeze-proof when installed vertically.

A novel form of baffle 17 is provided which is formed as part of the casing 10 and as can be seen in FIGURE 2, is solid and preferably of crescent shape. It is opposite the inlet 18 and provides deflection laterally part way around the valve 14. In addition to this lateral deflection of condensate and steam, the baffle 17 is also adapted to deflecting upwardly toward the bellows 13.

To understand the value of a baffle, let us first consider the operation of a trap having no baffle. In the absence of the baffle 17, the situation is a follows. The inlet passage 18 is connected by a pipe or conduit (not shown) to the apparatus which is to be drained and outlet passage 19 is connected to a discharge or drain pipe (also not shown). For a steam trap to accomplish its intended purpose there must be a higher pressure inside the chamber composed of the casing 10 and cap 11, and inside the upstream portion of the system above the valve seat, than is prevalent in the discharge orifice 21, the outlet passage 19 and the downstream portion such as any discharge or drain pipe connected thereto.

When sufficient condensate, and non-condensable gases, if any, have collected in the body or casing 10, the thermostatic element 13 will be cooled sufficiently to lift the valve 14 off the valve seat 15, thus opening the orifice 21. Because of the differences in pressure just referred to the water and gases in the casing are promptly discharged through orifice 21 and discharge outlet 19.

When the level of the discharging water in the body lowers to a point below the top of the inlet 18, live steam enters the casing through this inlet. This live steam causes the thermostatic element 13 to expand, moving the valve 14 into its seat 15 and stopping the flow of water and gas from the interior of the casing to the outlet 19. Once the valve 14 is closed on the orifice 21, condensate and non-condensable gases again begin to collect in the body of the trap. So long as the apparatus drained is supplied with steam, the operational cycle described will be repeated.

During the discharge portion of the cycle, partly due to the pressure drop in orifice 21 and in the region near the valve seat 15, as the discharging water falls to a level just above the top of the valve seat 15, a whirling or circular motion is induced in the discharging stream which tends to form a cavity or vacuum known as a vortex. Also, if the entering steam can follow a direct straight line flow from inlet passage 18 toward valve seat 15 and orifice 21, this direct flow and the pressure drop in the vortex will cause some live steam to be drawn into the orifice 21 and wasted each time the trap discharges, before the thermostatic element reseats the valve and closes the discharge. With the presence of the solid baffle 17 or the baffle 17', when live steam enters the casing, direct straight line flow from the inlet passage toward the orifice 21 is avoided, since the baffle obstructs the flow and diverts all the steam upwardly toward the bellows and to both sides, away from the orifice 21 (see FIGURE 7). This diverted flow pattern permits the steam to quickly contact and expand the thermostatic element 13, causing the valve to close before the steam is drawn into the low pressure region at the valve seat and orifice and the vortex above referred to. In this way the condensate is able to escape, the pressure difference is maintained, but the escape of live steam is prevented and the action of the thromstatic element hastened so that the valve is closed as shown, for example, in FIGURE 4, before live steam is discharged from the steam trap. By this deflection it will be noticed that the steam is delayed in its arrival at the orifice, no matter what stage of discharge of the condensate the trap may be at, and the steam is led to a point where the closing of the valve is hastened. It is believed that this novel baffle also assists in proventing the vortex. As mentioned above, the locating of the inlet at a level with or above the discharge orifice, and preferably horizontally, is important. It enables the system to be drained of virtually all condensate when the steam is turned off, leaving only a minimal amount of condensate in the trap. Freezing of this small amount of condensate hurts nothing. It cannot damage the system and will not damage the trap.

If desired, a baffle 17' of straight construction as shown in FIGURE 3 can be used if the construction and size of the trap body permits, but here again it permits fluids to be deflected around its ends and gain access in that way to the valve seat 15 and orifice 21 in a flow which otherwise would be a straight path if it were not for the baffle 17'.

In FIGURE 4 is shown a steam trap very similar to that in FIGURES 1 and 2 with the valve 14 down on its seat 22 as an illustration of the position of the parts when the valve is closed. In this case the baffle which is shown in plan in FIGURE 5 and identified by the numeral 20 is built as a separate element from the casing 10 of the steam trap. It is clamped between the valve seat 22 and the casing 10.

The construction shown in FIGURE 6 is known as a straight-through trap in that the outlet 23 is horizontal and in line with the inlet 18, with the valve seat still leading to the outlet. Although the construction of FIGURE 1 is adapted to many piping conditions, it can be installed only as shown, while the construction of FIGURE 6 can be installed either horizontally, as shown, or vertically with outlet down, and is adapted to those applications where the piping must be close to the floor, a wall or a pillar. Similar to the construction of FIGURE 1, the baffle 25 in FIGURE 6 maintains its parallelism with the valve and the discharge orifice but still is completely opposite both the inlet and the outlet. There is no connection between the interior of the casing and the discharge outlet except through the orifice 21 and the valve seat. It will be seen that there is a straight path of flow possible except for the baffle and that therefore this form of steam trap also has all the advantages of the other constructions arising from the fact that the inlet is at least as high as the baffle and as high as the valve seat to give the direct flow, subject only to the deflections previously described.

What is claimed is:

1. A steam trap having a casing, a casing cover, a thermostatic element suspended from the cover, a shield around the sides of the thermostatic element, a discharge valve carried on the lower end of the thermostatic element, a valve seat for said valve in a lower position of the casing, and an inlet in the casing for steam and condensate at a high enough level to provide a straight line gravity flow from the inlet to the seat, in the absence of a baffle, in combination with a solid baffle between the inlet and valve seat, said baffle extending upward to a point spaced below the shield but above the inlet, but only part way around the valve seat so as to deflect all the steam away from the straight line flow upward toward the thermal element and laterally around the inner periphery of the trap body, while permitting condensate to escape; whereby the thermal efficiency of the trap is increased by preventing the escape of live steam before the valve closes, and the ability of the trap to drain itself when the steam is shut off, is improved.

2. A steam trap having a casing, a casing cover, a thermostatic bellows suspended from the cover, a shield around the sides of the bellows, a discharge valve carried on the lower end of the bellows, a valve seat for said valve in a lower portion of the casing, and an inlet in the casing for steam and condensate at a high enough level to provide a straight line gravity flow from the inlet to the seat, in the absence of a baffle, in combination with a solid baffle, in the casing between the inlet and the valve seat, said baffle extending upward to a point below the shield but above the inlet, but only partway around the valve seat to deflect all the steam upwardly toward the bellows and around the inner periphery of trap body, while guiding the condensate laterally around the ends of the baffle to the seat for prompt discharge, whereby substantially complete drainage of condensate from the trap is achieved when the valve is open.

3. A steam trap having a casing, a casing cover, a thermostatic bellows suspended from the cover, a shield around the sides of the bellows, a discharge valve associated with the bellows and moved between open and closed position by the expansion and contraction of the bellows, a valve seat in a lower portion of the casing for said valve, and an inlet in the casing for steam and condensate at a high enough level to provide a straight line gravity flow from the inlet to the seat, in the absence of a baffle, in combination with a solid baffle to prevent said straight line flow, said baffle extending upward, spaced below the shield but above the inlet, but only part way around the valve seat, so as to deflect steam upwardly toward the bellows and the condensate around the ends of the baffle toward the valve seat.

References Cited by the Examiner

UNITED STATES PATENTS

| | | | |
|---|---|---|---|
| 1,112,448 | 10/15 | Hatch | 236—59 |
| 1,310,026 | 7/19 | Lippert | 236—59 |
| 1,846,226 | 2/32 | Smith | 236—56 |
| 1,881,246 | 10/32 | Simpson | 236—58 |
| 1,934,205 | 11/33 | Oakley et al. | 236—56 |
| 2,022,722 | 12/35 | Hyatt | 236—56 |
| 2,513,875 | 7/50 | Johnson | 236—56 |
| 2,628,783 | 2/53 | Fernald | 236—58 |

FOREIGN PATENTS 457,441   11/36   Great Britain.

WILLIAM F. O'DEA, *Acting Primary Examiner.*

ALDEN D. STEWART, EDWARD J. MITCHELL, *Examiners.*